United States Patent [19]

Ehlers et al.

[11] Patent Number: 5,587,440
[45] Date of Patent: Dec. 24, 1996

[54] PROCESS FOR THE PREPARATION OF ULTRAHIGH MOLECULAR WEIGHT POLYETHYLENE HAVING A HIGH BULK DENSITY

[75] Inventors: Jens Ehlers, Oberhausen; Jutta Walter, Neukirchen-Vluyn, both of Germany

[73] Assignee: Hoechst Aktiengesellschaft, Germany

[21] Appl. No.: 605,466

[22] Filed: Feb. 26, 1996

Related U.S. Application Data

[63] Continuation of Ser. No. 309,429, Sep. 20, 1994, abandoned.

[30] Foreign Application Priority Data

Sep. 27, 1993 [DE] Germany .......................... 43 32 786.9

[51] Int. Cl.$^6$ .............................. C08F 4/655; C08F 10/02
[52] U.S. Cl. ........................... 526/153; 502/110; 526/352
[58] Field of Search ............................................. 526/153

[56] References Cited

U.S. PATENT DOCUMENTS

| | | | |
|---|---|---|---|
| 2,954,367 | 9/1960 | Vandenberg | 526/153 |
| 3,058,963 | 10/1962 | Vandenberg | 526/153 |
| 3,257,368 | 6/1966 | Winkler et al. | 526/153 |
| 3,910,870 | 10/1975 | Lutz et al. | 526/159 |
| 4,007,132 | 2/1977 | Rust et al. | 526/153 |
| 4,250,283 | 2/1981 | Caunt et al. | 526/153 |
| 4,547,473 | 10/1985 | Hamilton et al. | 526/153 |

FOREIGN PATENT DOCUMENTS

| | | |
|---|---|---|
| 526891 | 2/1993 | European Pat. Off. . |
| 2361508 | 3/1979 | Germany . |
| 2361052 | 12/1982 | Germany . |
| 960232 | 6/1964 | United Kingdom . |

*Primary Examiner*—Edward J. Smith
*Attorney, Agent, or Firm*—Bierman and Muserlian

[57] ABSTRACT

A process for the preparation of ultrahigh molecular weight polyethylene having a high bulk density by polymerization of ethylene in the presence of a mixed catalyst, the catalyst comprising an organic aluminum compound and a titanium component prepared by reduction of a Ti(IV) compound and after-treatment of the reduction product thereof with an organic aluminum compound.

12 Claims, No Drawings

PROCESS FOR THE PREPARATION OF ULTRAHIGH MOLECULAR WEIGHT POLYETHYLENE HAVING A HIGH BULK DENSITY

PRIOR APPLICATION

This application is a continuation of U.S. patent application Ser. No. 309,429 filed Sep. 20, 1994, now abandoned.

This Application claims the benefit of the priority of German Application P 43 32 786.9 filed Sep. 27, 1993.

The Invention relates to a process for the preparation of ultrahigh molecular weight polyethylene (UHMW-PE) having a bulk density of 350 to 460 g/liter, in particular 430 to 460 g/liter.

BACKGROUND OF THE INVENTION

The term ultrahigh molecular weight polyethylene refers to linear polyethylenes obtained by the low pressure process and having viscometrically measured average molecular weights of at least $10^6$ g/mol, in particular $2.5 \times 10^6$ g/mol to more than $10^7$ g/mol. The above-mentioned molecular weights are determined from the solution viscosities according to the Margolies equation. The method used for this determination is described, for example, in CZ Chemie Technik 4 (1974), 129 et seq.

UHMW-PE occupies a special position among the polyethylenes. It is distinguished by a number of physical characteristics which make it suitable for a wide range of potential applications. Its high resistance to wear, low coefficient of friction compared with other materials, excellent toughness characteristics, and high thermal stability under load are worthy of particular mention. In addition, it is remarkably resistant to a large number of chemicals. Owing to these particular mechanical, thermal and chemical properties, UHMW-PE is now used as a high quality specialty material in a wide range of applications. Examples are the textile industry, mechanical engineering, the chemical industry, and mining.

There are various known processes for the preparation of this special polyethylene grade. Low pressure polymerization of ethylene using Ziegler catalysts, i.e. mixtures of compounds of subgroups IV to VI of the Periodic Table of Elements (IUPAC version) with organometallic compounds of groups I to III of the Periodic Table, have proven suitable. Among the compounds of the elements of subgroups IV to VI, titanium compounds are the most important. The most frequently used organometallic compounds of groups I to III are alkylaluminums and alkylaluminum halides.

In general the Ziegler catalysts are prepared by reduction of Ti(IV) compounds, such as titanium tetrachloride or titanates, with organoaluminum compounds. This yields Ti(III) compounds, which are frequently isolated, suspended in a suitable medium, and mixed with the activator required for polymerization.

In one proven process for the ethylene with UHMW-PE, oxygen content of less than 5 ppm is polymerized at 30° to 130° C. and a pressure of 0.1 to 10 MPa using catalysts which contain titanium (III) halides and organoaluminum compounds in a molar ratio of 1:0.2 to 1:5. Monohydric or polyhydric aliphatic alcohols are added, in amounts of 2 to 10 mol, based on 1 kg of catalyst, to the reaction mixture during polymerization. Diethylaluminum monochloride is used as the organoaluminum component of the catalyst (DE-C-2,361,508).

In another process, unsaturated polymeric organoaluminum compounds, for example isoprenylaluminum or myrcenylaluminum, are used as the aluminum compound in the catalyst system (DE-C-2,361,052).

As a raw material, UHMW-PE is used predominantly in the form of powder; therefore, the powder morphology and consequently the bulk density are important properties on which its processibility depends. Thus, for example, the properties of the porous moldings which are obtained by sintering pulverulent UHMW-PE, as well as the production of fibers having a high modulus or battery separators containing silica as a filler, are determined substantially by the size and shape of the polymer particles and the width of the molecular weight distribution. However, the morphology of the powder is also important for the production process itself and for storage. Coarse particles having a narrow particle size distribution and high bulk density require less energy for drying, and storage requires less space.

SUMMARY OF THE INVENTION

The processes known to date for the preparation of UHMW-PE make it possible to influence the external shape of the polymer particles only within very narrow limits. It is, therefore, an object of the Invention to develop a procedure which permits the preparation of pulverulent, ultrahigh molecular weight polyethylene having a narrow granulometry and a selected bulk density. At the same time, the process should also provide a low level of agglomeration and deposition in the reactor.

These objects are achieved by a process for the preparation of pulverulent polyethylene having a viscometrically measured molecular weight of at least $10^6$ g/mol and a bulk density of 350 to 460 g/liter, in particular 430 to 460 g/liter. The polyethylene is prepared by the polymerization of ethylene at temperatures of 30° to 130° C. and pressures of 0.05 to 4 MPa in the presence of a mixed catalyst. The catalyst comprises a titanium component and an organic aluminum compound; if desired, a molecular weight regulator may also be present. In the process, the titanium component is obtained by reaction in two stages. In the first stage, a titanium (IV) compound is reacted with first organic aluminum compound at −40° to 140° C. in a molar ratio of titanium to aluminum of 1:0.1 to 1:0.6 to give a titanium (III) compound. In the second stage, the reaction product of the first stage is after-treated with a second organic aluminum compound at −10° to 150° C. in a molar ratio of titanium to aluminum of 1:0.01 to 1:5 and the titanium component is introduced into the mixed catalyst with a third organic aluminum compound in a molar ratio of titanium to aluminum of 1:1 to 1:15.

The novel process makes it possible to tailor the bulk density of ultrahigh molecular weight polyethylene by variation of the aftertreatment of the titanium (III) compound of the first reaction stage with the second organic aluminum compound; thus, UHMW-PE can be produced in the range of 350 to 460 g/liter, in particular 430 to 460 g/liter. The bulk density is understood as meaning the value determined according to DIN 53 468.

DETAILED DESCRIPTION OF THE INVENTION

To prepare the titanium (III) compounds, titanium (IV) compounds are used as starting materials in the first stage. Suitable compounds include those of the general formula $Ti(OR^1)_{4-n}X_n$; wherein n is an integer from 1 to 4; the $R^1$'s are the same or different hydrocarbon radicals, in particular alkyl radicals having 1 to 18, preferably 2 to 8, carbon atoms; and X is halogen, in particular chlorine or bromine. TICl$_4$, TiBr$_4$, Ti(OC$_2$H$_5$)Cl$_3$, Ti(OC$_5$H$_7$)Cl$_3$, and Ti(O-i-C$_4$H$_9$)Cl$_3$ may be mentioned as examples. Organic aluminum compounds which may be used, according to the invention, for the reduction of the Ti(IV) compounds, include those of the general formula AlR$^2$$_{3-m}$X$_m$ wherein m is 0, 1 or 2, the R$^2$'s are the same or different alkyl radicals having 1 to 12, in particular 2 to 6 carbon atoms, and X is halogen, in particular chlorine or bromine. Examples of such compounds are triethylaluminum, triisobutylaluminum, diethylaluminum chloride, and ethylaluminum dichloride. Polymeric organic aluminum compounds which are obtained from the reaction of lithium aluminum hydride, trialkylaluminums, or dialkylaluminum hydrides, the alkyl radicals of which each have 1 to 16 carbon atoms, with diolefins having 4 to 20—in particular 4 to 12—carbon atoms, are also suitable. In contrast to the mononuclear trialkylaluminum compounds and the alkylaluminum halides, they are polynuclear. The reaction products of Al(i-C$_4$H$_9$)$_3$ or Al(i-C$_4$H$_9$)$_2$H with isoprene ("isoprenylaluminum") are preferably used. The aluminum compounds may be used in pure form or as a mixture of two or more compounds.

The reaction of the Ti(IV) compound with the organic aluminum compound is carried out in an inert solvent at temperatures of −40° to 140° C., preferably −20° to 120° C. The concentrations of the reactants in the starting solutions are 0.1 to 9.1 mol of Ti(IV) compound/liter of solvent and 0.05 to 1.0 mol of Al compound/liter of solvent. In particular, 5.0–9.1 mol of Ti(IV) compound and 0.2–0.9 mol of Al compound, in each case per liter of solvent, are employed. 0.1 to 0.6, preferably 0.3 to 0.5, mol of aluminum in the form of an organic aluminum compound is used per mol of titanium (IV). Aliphatic hydrocarbons have proven suitable as inert solvents. Depending on the temperature, the reaction is complete after 1 to 600 min. The degree of reduction determined by cerimetry is at least 95%.

According to the invention, the reduction is followed by an aftertreatment of the reduction product with an organic aluminum compound, as a second stage. For this purpose, the reduction product is filtered out of the suspension, washed with the solvent or suspending medium, and suspended again in an inert organic solvent. However, the suspension obtained in the reduction can also be used directly. The latter procedure is advisable whenever the reduction of the titanium (IV) compound is carried out by means of the aluminum compound using a molar ratio of titanium to aluminum of about 1:0.5.

For the aftertreatment, the reduction product is reacted with an organic aluminum compound, which is preferably added as a solution or suspension. The reactants are allowed to act on one another over a period of 1 to 1200 minutes and at temperatures of −10° to 150° C., preferably 0° to 70° C., with stirring. The organic aluminum compounds used include mononuclear or polynuclear mono- or dialkylaluminum halides, and trialkylaluminum compounds. In order to prevent over-reduction and hence inhibition of the catalyst, isoprenylaluminum (IPRA) is preferably used. The reaction is detectable externally from a deepening of the color of the titanium compound from reddish brown to brownish black. As investigations have shown, the reaction involves not a progressive reduction of the titanium (IV) compound, but an irreversible reduction in the molecular ratio of titanium to aluminum in the solid. While this ratio is 1 to 0.2 to 0.33 in the reduction product, it becomes about 1:0.4 to 0.6 as a result of the aftertreatment with the organic aluminum compound. The molar ratio of titanium to aluminum during the aftertreatment, the reaction time, the reduction potential of the alkylaluminum, and the reaction temperature are critical for the magnitude of the increase. Usually, a molar ratio of titanium to aluminum of 1:0.01 to 1:5, preferably 1:0.4 to 1:1.2, is maintained. The molar ratio of titanium in the product of the aftertreatment ("titanium component") to aluminum determines the polymer morphology and hence the particle size distribution of the bulk density of the polymer. Molar titanium/aluminum ratios in the lower range during the aftertreatment give bulk densities below 400 g/liter, while those in the upper range give bulk densities below 430 to 460 g/liter. The catalyst suspension thus obtained can be used directly or, after being filtered off and, for example, washed with the suspending medium.

For the formation of the catalyst, the titanium component is activated with an organoaluminum compound. As in the reduction, the aluminum compound may be used in pure form, or as a mixture of two or more compounds, triisobutylaluminum or isoprenylaluminum preferably being used as the activator. The molar ratio of titanium (based on the amount of titanium originally used as Ti(IV) compound) to aluminum in the mixed catalyst is 1:1 to 1:15, preferably 1:2 to 1:10.

The polymerization is carried out in suspension in one or more stages, continuously or batchwise, at temperatures of 30° to 130° C., preferably 60° to 100° C., and an ethylene partial pressure of less than 4.0 MPa, preferably 0.05 to 0.8 MPa. The molecular weights of the polymers can be adjusted in known manner by means of molecular weight regulators, preferably hydrogen. The ratio of ethylene partial pressure to hydrogen partial pressure is at least 10, preferably 40 to 1600.

The inert diluents usually used for the Ziegler low-pressure process, such as aliphatic or cycloaliphatic hydrocarbons, e.g. butane, pentane, hexane, cyclohexane, nonane, and decane, are suitable as reaction media for the polymerization. Furthermore, gasoline or hydrogenated diesel oil fractions, which have been carefully freed from oxygen, sulfur compounds, and moisture, may also be used. Their boiling range is between −5° and 220° C., preferably between 65° and 180° C. The polymer is separated from the suspending medium under an inert gas and dried. In the absence of air and moisture, the suspending agent is reused for the polymerization without any intermediate treatment.

In the Examples which follow, the invention is described in detail, but is not restricted to the embodiments shown.

The following values are stated for describing the polymers:

Mean particle diameter: determined by laser diffraction using the particle size analyzer Helos-Rhodos measurement and evaluation system from Sympatec GmbH; optical concentration about 10%.

s-value: this serves as a measure of the width of the particle size distribution and is expressed by the formula $$s = \log \frac{d(90)}{d(10)}$$

d(90) and d(10) are the particle sizes at 90% and at 10%, obtained from the cumulative distribution; s increases with increasing width of the particle size distribution.

ZST or flow value: this serves as a measure of the molecular weight and is determined according to DIN 53 493; and Bulk density: determined according to DIN 53 468.

EXAMPLE 1

1.1. Preparation of the Base Catalyst (Catalyst According to the Prior Art)

44.1 liters of titanium tetrachloride is metered into 230 liters of a 20% by weight solution of isoprenylaluminum (corresponding to a ratio of 1 mol of Ti to 0.5 mol of Al) in 200 mol of hexane under an inert gas atmosphere, with stirring. The metering takes place at a temperature of −10° C. over the course of 7 hours. The reaction is complete 3 hours thereafter. More than 96% of the Ti(IV) used is reduced to Ti(III).

1.2. Polymerization Using the Catalyst Prepared According to 1.1.

The polymerization is carried out in one stage in a continuously operated plant with recycling of the reaction medium. Gasoline purified over molecular sieves and having a boiling range of 140° to 170° C. serves as the suspending medium.

At a reaction temperature of 80° C. and a yield, based on catalyst used, of 1.7 kg of PE/mmol of Ti, the resulting ethylene partial pressure is about 0.32 MPa. The hydrogen content of the gas phase is about 0.5% by volume; the ratio of suspending medium to polyethylene (in liters/kg) is 4.3. The activator (IPRA) concentration in the reaction medium fed to the reactor is adjusted so that the molar ratio of titanium component to aluminum (based on the amount of titanium originally used as Ti(IV) compound) in the reactor is about 1:10. The molecular weight of the polymer is controlled via the hydrogen content of the reactor gas phase. The following product properties are obtained in a reproducible manner in two parallel experiments (A and B):

|  | Experiment A | Experiment B |
|---|---|---|
| Mean particle diameter [μm] | 210 | 200 |
| s value | 0.51 | 0.51 |
| Bulk density [g/l] | 370 | 380 |
| ZST value [N/mm$^2$] | 0.24 | 0.24 |

EXAMPLE 2

2.1. Preparation of a Catalyst According to the Invention

The catalyst (K0) described under 1.1 is diluted to a concentration of about 40 mmol of titanium component/liter and treated at room temperature with IPRA (K1 to K6). A deepening of color from reddish brown to dark brown occurs, depending on the amount of alkylaluminum used. The degree of reduction remains unchanged. On the other hand, the ratio of titanium to chemically fixed aluminum in the catalyst solid goes from 1:0.2–0.33 to 1:0.6. To determine these values by atomic absorption spectroscopy, the catalyst is filtered under an inert gas and washed twice with gasoline.

| Catalyst designation | Catalyst treatment Ti total:Al | Bound Al Ti:Al |
|---|---|---|
| K0 | 0 | 1:0.32 |
| K1 | 1:0.05 | 1:0.21 |
| K2 | 1:0.1 | 1:0.23 |
| K3 | 1:0.5 | 1:0.55 |
| K4 | 1:1 | 1:0.45 |
| K5 | 1:2 | 1:0.5 |
| K6 | 1:5 | 1:0.4 |

After a reaction time of 24 hours, the catalyst is used for the polymerization. K6 shows that, under otherwise identical conditions, the use of larger amounts of the organic aluminum compound does not lead to an increase in the proportion of aluminum in the titanium component.

2.2. Polymerizations Using the Catalyst Prepared According to 2.1.

2.2.1. Use of Catalyst Not Separated

For the synthesis of ultra high molecular weight polyethylene (UHMW-PE), catalysts K3 and K5 are used directly after the preparation, i.e. neither filtered nor washed, in a manner analogous to that of the process described under 1.1. Compared with the reference catalyst K0, the reaction temperature is reduced to about 78° C. and the molar ratio of titanium component (based on Ti(IV) compound originally used) to aluminum (IPRA) in the reactor is about 1:3.0, in order to establish an ethylene partial pressure of about 0.25 MPa. The hydrogen content is adjusted in accordance with Example 1.2.

2.2.2. Use of a Catalyst Separated Beforehand

The polymerization is carried out as described under 2.2.1. Catalyst K4, which is filtered and washed with the suspending agent before being used, is employed.

Results of the polymerization experiments:

| Catalyst type | Yield [kg of PE/ mmol of Ti] | Mean particle diameter [μm] | s value | Bulk density [g/l] | ZST [N/mm$^2$] |
|---|---|---|---|---|---|
| K3 | 1.1 | 150 | 0.43 | 450 | 0.24 |
| K4 | 2.8 | 160 | 0.39 | 460 | 0.24 |
| K5 | 3.3 | 180 | 0.43 | 445 | 0.24 |

Reference experiment 1.2.

| | | Reference experiment 1.2. | | | |
|---|---|---|---|---|---|
| K0 | 1.7 | 210 | 0.51 | 370 | 0.24 |

While only a limited number of specific embodiments of the present Invention have been expressly disclosed, it is, nonetheless, to be broadly construed, and not to be limited except by the character of the claims appended hereto.

What we claim is:

1. A process for the preparation of pulverulent polyethylenes having viscometrically measured molecular weights of at least 10$^6$ g/mol and bulk densities of 430 to 460 g/liter by polymerization of ethylene at polymerization temperatures of 30° to 130° C. and pressures of 0.05 to 4 MPa in the presence of a mixed catalyst and a molecular weight regulator, said mixed catalyst comprising a titanium component and an activator, said titanium component being produced by a reaction having a first stage and a second stage, in said first stage, a Ti(IV) compound of the formula $Ti(OR^1)_{4-n}X_n$ wherein n is an integer from 1 to 4, the $R^1$'s are independently hydrocarbon radicals and X is halogen, is reacted with a first organoaluminum compound which is selected from the group consisting of organoaluminum compounds having the formula $AlR^2{}_3$, wherein the $R^2$'s are independently alkyl radicals having 1 to 12 carbon atoms, and polymeric organoaluminum compounds which are obtained from the reaction of lithium aluminum hydride, trialkylaluminum, or dialkylaluminum hydrides, the alkyl radicals of which each have 1 to 16 carbon atoms, with diolefins having 4 to 20 carbon atoms, at −40° C. to 140° C. in a first molar ratio of titanium to aluminum of 1:0.1 to 1:0.6 to form a titanium (III) compound as a first reaction product and in a second stage, said first reaction product is aftertreated with isoprenylaluminum as second organoaluminum compound at −10° to 150° C. in a second molar ratio of titanium to aluminum of 1:0.4 to 1:5, thereby forming said titanium component, and forming said titanium component into said mixed catalyst by adding said activator, which is a third aluminum compound selected from the group consisting of triisobutylaluminum, isoprenylaluminum, and mixtures thereof in a third a molar ratio of titanium in said Ti (IV) compound to aluminum in said third aluminum compound of 1:1 to 1:15.

2. The process of claim 1 wherein said $R^1$'s are alkyls having 1 to 18 carbon atoms.

3. The process of claim 2 wherein said $R^1$'s have 2 to 8 carbon atoms.

4. The process of claim 1 wherein said $R^2$'s have 2 to 6 carbon atoms.

5. The process of claim 1 wherein X is chlorine or bromine.

6. The process of claim 1 wherein said first aluminum compound is isoprenylaluminum.

7. The process of claim 1 wherein said first stage is carried out at a first stage temperature of −20° to 120° C.

8. The process of claim 1 wherein, per mol of said Ti(IV), 0.3 to 0.5 mol of organoaluminum in said first aluminum compound is used.

9. The process of claim 1 wherein said Ti(III) compound is filtered and washed with an inert solvent prior to aftertreatment.

10. The process of claim 1 wherein said second molar ratio is 1:0.4 to 1:1.2.

11. The process of claim 1 wherein said third molar ratio is 1:2 to 1:10.

12. The process of claim 1 wherein at least two of said first, second, and third organoaluminum compounds are the same.

* * * * *